United States Patent
Hwang et al.

(10) Patent No.: US 9,118,568 B2
(45) Date of Patent: Aug. 25, 2015

(54) AUTOMOTIVE PARTIAL NETWORKING APPARATUS AND METHOD

(71) Applicant: Electronics and Telecommunications Research Institute, Daejeon (KR)

(72) Inventors: Hyun-Yong Hwang, Daejeon (KR); Jeong-Hwan Lee, Gyeonggi-do (KR); Joo-Chul Lee, Daejeon (KR); Tae-Man Han, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 364 days.

(21) Appl. No.: 13/683,794

(22) Filed: Nov. 21, 2012

(65) Prior Publication Data

US 2013/0250804 A1 Sep. 26, 2013

(30) Foreign Application Priority Data

Mar. 26, 2012 (KR) .................. 10-2012-0030511

(51) Int. Cl.
*H04L 12/56* (2006.01)
*H04L 12/28* (2006.01)
*H04L 12/24* (2006.01)
*H04L 12/40* (2006.01)

(52) U.S. Cl.
CPC .......... *H04L 41/12* (2013.01); *H04L 12/40039* (2013.01); *H04L 12/40169* (2013.01); *H04L 2012/40215* (2013.01)

(58) Field of Classification Search
None
See application file for complete search history.

(56) References Cited

U.S. PATENT DOCUMENTS

| 7,430,261 | B2* | 9/2008 | Forest et al. | 375/364 |
| 8,750,351 | B2* | 6/2014 | Muth | 375/219 |
| 2012/0030330 | A1 | 2/2012 | Rocher et al. | |
| 2012/0257655 | A1* | 10/2012 | Muth | 375/219 |
| 2012/0271975 | A1* | 10/2012 | Elend | 710/105 |
| 2012/0297105 | A1* | 11/2012 | Elend | 710/305 |

FOREIGN PATENT DOCUMENTS

| KR | 10-2009-0030765 A | 3/2009 |
| KR | 10-2011-0033724 A | 3/2011 |
| WO | WO 2010/070218 A1 | 6/2010 |

* cited by examiner

*Primary Examiner* — Kwang B Yao
*Assistant Examiner* — Adam Duda
(74) *Attorney, Agent, or Firm* — Rabin & Berdo, P.C.

(57) ABSTRACT

The present invention relates to a automotive partial networking apparatus and method, which operate or terminate only a specific electronic control unit corresponding to a service currently being provided in a vehicle network composed of a plurality of electronic control units. In the automotive partial networking method, a automotive partial networking apparatus receives a partial networking-only Controller Area Network (CAN) frame from outside of the apparatus. A partial network table is searched based on the CAN frame, and then a CAN identification (ID) is searched for. A partial networking-only CAN frame is generated using the CAN ID. Partial networking is performed by transferring the generated partial networking-only CAN frame to at least one electronic control unit corresponding to a vehicle service.

13 Claims, 5 Drawing Sheets

AUTOMOTIVE PARTIAL NETWORKING APPARATUS AND METHOD

CROSS REFERENCE TO RELATED APPLICATION

This application claims the benefit of Korean Patent Application No. 10-2012-0030511, filed on Mar. 26, 2012, which is hereby incorporated by reference in its entirety into this application.

BACKGROUND OF THE INVENTION

1. Technical Field

The present invention relates generally to an automotive partial networking apparatus and method. More particularly, the present invention relates to an automotive partial networking apparatus and method, which operate or terminate only a specific electronic control unit corresponding to a service currently being provided in a vehicle network composed of a plurality of electronic control units.

2. Description of the Related Art

A vehicle network is composed of a plurality of electronic control units (hereinafter also referred to as "ECUs") according to the type of service in various domains constituting a vehicle. Here, the various domains include a power train domain related to fuel efficiency of the vehicle, a body domain related to user comfort, a chassis domain related to user safety, and an infotainment domain related to information and entertainment.

In detail, such an ECU is used as an engine control system, a self-diagnosis device, an automatic-transmission, or the like in the power train domain. Further, an ECU is used as a body electric/electronic control system, a convenience device control system, a lamp control system, or the like in the body domain. Furthermore, an ECU is used as a steering apparatus control system, a brake control system, a suspension control system, or the like in the chassis domain. Furthermore, an ECU is used as a navigation device, a telematics device, a multimedia system, or the like in the infotainment domain.

In this way, the trend is for the number of ECUs constituting the vehicle network to gradually increase as the number of convenience devices mounted in and technologies applied to a vehicle increases.

However, at the present time, ECUs constituting the vehicle network are problematic in that when power is applied to a vehicle, ECUs are always operating regardless of the service, thus producing standby power and increasing carbon dioxide ($CO_2$) emissions.

SUMMARY OF THE INVENTION

Accordingly, the present invention has been made keeping in mind the above problems occurring in the prior art, and an object of the present invention is to provide a automotive partial networking apparatus and method, which operate or terminate only a specific electronic control unit corresponding to a service currently being provided in a vehicle network composed of a plurality of electronic control units.

In accordance with an aspect of the present invention to accomplish the above object, there is provided a automotive partial networking method, including a automotive partial networking apparatus receiving a partial networking-only Controller Area Network (CAN) frame from outside of the apparatus; searching a partial network table based on the CAN frame for a CAN identification (ID); generating a partial networking-only CAN frame using the CAN ID; and performing partial networking by transferring the generated partial networking-only CAN frame to at least one electronic control unit corresponding to a vehicle service.

Preferably, the CAN ID of the partial networking-only CAN frame may have a format identical to that of a CAN ID of a CAN frame complying with an International Organization for Standardization (ISO) 11898 standard.

Preferably, the searching for the CAN ID may include extracting a service ID from the CAN frame; and searching the partial network table using the extracted service ID for the CAN ID.

Preferably, the performing the partial networking may be configured such that the at least one electronic control unit extracts a specific command from the partial networking-only CAN frame, and selectively determines whether to operate in compliance with the extracted command.

Preferably, the CAN frame may include a CAN ID and CAN data, and the CAN data comprises a service ID indicative of the vehicle service and an ON/OFF command indicative of operation and termination of a corresponding electronic control unit.

Preferably, the partial network table may include a service ID indicative of a type of service supported by a vehicle, location information about an electronic control unit which is located on a bus and is to be used to provide the vehicle service at a current time, and an ID of a CAN frame which is used to transfer a message to an electronic control unit required to provide the vehicle service at the current time.

In accordance with another aspect of the present invention to accomplish the above object, there is a automotive partial networking apparatus, including a frame reception unit for receiving a partial networking-only Controller Area Network (CAN) frame from outside of the apparatus; a search unit for searching a partial network table based on the CAN frame for a CAN identification (ID); a frame generation unit for generating a partial networking-only CAN frame using the CAN ID; and a networking unit for performing partial networking by transferring the generated partial networking-only CAN frame to at least one electronic control unit corresponding to a vehicle service.

Preferably, the search unit may extract a service ID from the CAN frame, search the partial network table using the extracted service ID for the CAN ID.

Preferably, the at least one electronic control unit that received the partial networking-only CAN frame from the networking unit may be configured to extract a specific command from the partial networking-only CAN frame, and selectively determine whether to operate in compliance with the extracted command.

Preferably, the CAN ID of the partial networking-only CAN frame may have a format identical to that of a CAN ID of a CAN frame complying with an International Organization for Standardization (ISO) 11898 standard.

Preferably, the CAN frame may include a CAN ID and CAN data.

Preferably, the CAN data may include a service ID indicative of the vehicle service and an ON/OFF command indicative of operation and termination of a corresponding electronic control unit.

Preferably, the partial network table may include a service ID indicative of a type of service supported by a vehicle, location information about an electronic control unit which is located on a bus and is to be used to provide the vehicle service at a current time, and an ID of a CAN frame which is used to transfer a message to an electronic control unit required to provide the vehicle service at the current time.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figures 1, 2:
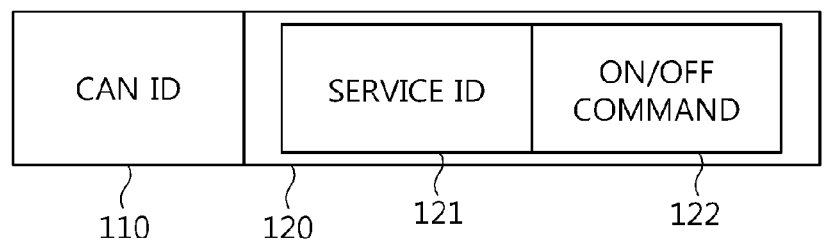
FIG. 1 is a diagram showing the basic structure of a CAN frame according to an embodiment of the present invention.
FIG. 2 is a diagram showing the basic structure of a partial network table according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, an automotive partial networking apparatus and method according to embodiments of the present invention will be described in detail with reference to the attached drawings.

First, in the field of vehicle networking, Partial Networking (PN) for vehicles refers to the function of activating a specific part of a network at a specific point in time.

FIG. 1 is a diagram showing the basic structure of a CAN frame according to an embodiment of the present invention.

Referring to FIG. 1, a controller area network (hereinafter also referred to as "CAN") frame 100 is a frame that supports a partial networking service for vehicles. That is, the automotive partial networking apparatus generates a partial networking-only CAN frame 100, and transfers the CAN frame 100 to a specific electronic control unit (not shown) corresponding to a vehicle service.

The CAN frame 100 includes a CAN identification (ID) 110 and CAN data 120.

The CAN ID 110 corresponds to partial networking-only CAN ID, and has the same format as that of a CAN frame complying with the ISO 11898 standard.

The CAN data 120 includes a service ID 121 indicative of the vehicle service and an ON/OFF command 122 indicative of the operation and the termination of a corresponding electronic control unit.

FIG. 2 is a diagram showing the basic structure of a partial network table according to an embodiment of the present invention.

First, an electronic control unit supporting a partial networking service for vehicles must internally include a partial network table 200.

Referring to FIG. 2, the partial network table 200 includes a service ID 210, a bitmap 220, and a CAN ID 230.

The service ID 210 indicates the type of service supported by a vehicle, and is identical to the service ID 121 of FIG. 1. For example, the service ID 210 may indicate the type of service supported by the vehicle in the form of a numeral (e.g., 0, 1, 2).

The bitmap 220 indicates location information about an electronic control unit, which is located on a bus and must be used to provide a vehicle service at the current time, that is, an electronic control unit number (an ECU number).

The CAN ID 230 indicates the ID of the CAN frame 100 (=CAN ID 110) that is used to transfer a message to an electronic control unit required to provide the vehicle service at the current time. For example, the CAN ID 230 may be indicated in the form of a numeral (e.g., 101, 102, 103).

Next, the automotive partial networking apparatus will be described in detail with reference to FIG. 3.

Figure 3:
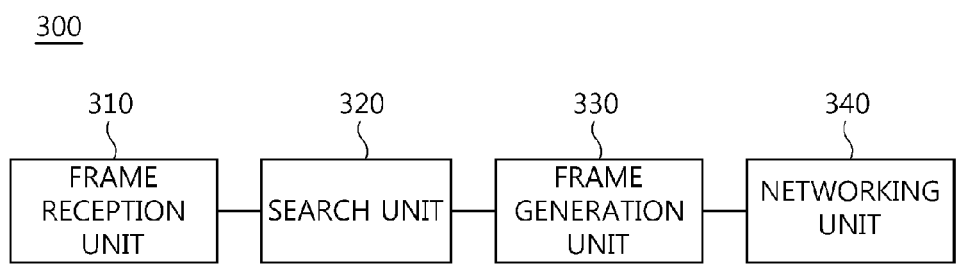
FIG. 3 is a block diagram schematically showing the configuration of a automotive partial networking apparatus according to an embodiment of the present invention.

FIG. 3 is a block diagram schematically showing the configuration of an automotive partial networking apparatus according to an embodiment of the present invention.

First, an automotive partial networking apparatus 300 supporting partial networking for vehicles according to an embodiment of the present invention can support partial networking for vehicles in an electronic control unit, but it is not limited to such a structure.

Referring to FIG. 3, the automotive partial networking apparatus 300 includes a frame reception unit 310, a search unit 320, a frame generation unit 330, and a networking unit 340.

The frame reception unit 310 receives a partial networking-only CAN frame 100.

The search unit 320 extracts a service ID 121 from the received CAN frame 100, searches the partial network table 200 using the extracted service ID 121 for a bitmap 220 and a CAN ID 230. Here, the CAN frame 100 includes a CAN ID 110 and CAN data 120. The CAN data 120 includes a service ID 121 indicative of a vehicle service and an ON/OFF command 122 indicative of the operation and termination of an electronic control unit.

The frame generation unit 330 generates a partial networking-only CAN frame using the CAN ID 230 found by the search unit 320. In this case, the frame generation unit 330 replaces the previous CAN ID, that is, the found CAN ID 230, with a new CAN ID when two or more networks are connected and a partial networking-only CAN frame must be transferred over different networks.

The networking unit 340 performs partial networking by transferring the generated partial networking-only CAN frame to at least one electronic control unit corresponding to a vehicle service. In this case, the at least one electronic control unit that received the partial networking-only CAN frame extracts an ON/OFF command from the CAN frame, and selectively determines whether to operate in compliance with the ON/OFF command.

Next, an automotive partial networking method will be described in detail with reference to FIG. 4.

Figure 4:
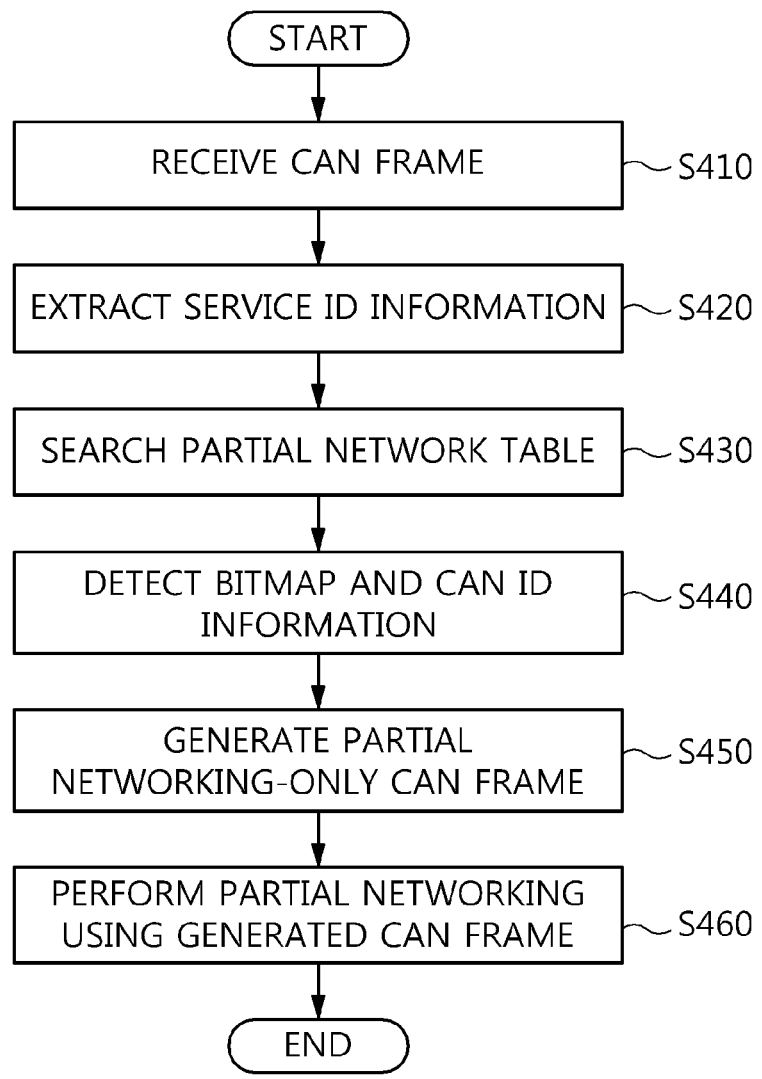
FIG. 4 is a flowchart showing a automotive partial networking method according to an embodiment of the present invention.

FIG. 4 is a flowchart showing an automotive partial networking method according to an embodiment of the present invention.

Referring to FIG. 4, the automotive partial networking apparatus 300 externally receives a partial networking-only CAN frame 100 at step S410. Here, the CAN frame 100 includes a CAN ID 110 and CAN data 120. The CAN data 120 includes a service ID 121 indicative of a vehicle service and an ON/OFF command 122 indicative of the operation and the termination of a corresponding electronic control unit.

The automotive partial networking apparatus 300 extracts a service ID 121 from the received CAN frame 100 at step S420.

The automotive partial networking apparatus 300 searches the partial network table 200 using the extracted service ID 121 at step S430. Next, the automotive partial networking apparatus 300 searches the partial network table 200 searched at step S430 for a bitmap 220 and a CAN ID 230 at step S440.

The automotive partial networking apparatus 300 generates a partial networking-only CAN frame using the CAN ID 230, found at step S440, at step S450. In this case, the automotive partial networking apparatus 300 replaces the previous CAN ID, that is, the found CAN ID 230, with a new CAN ID when two or more networks are connected and the partial networking-only CAN frame must be transferred over different networks.

The automotive partial networking apparatus 300 performs partial networking by transferring the generated partial networking-only CAN frame to at least one electronic control unit corresponding to the vehicle service at step S460. In this case, the at least one electronic control unit that received the partial networking-only CAN frame extracts an ON/OFF command from the CAN frame, and selectively determines whether to operate in compliance with the ON/OFF command.

Next, the automotive partial networking method applied to one network or to two or more networks according to an embodiment of the present invention will be described in detail with reference to FIGS. 5 and 6.

Figure 5:
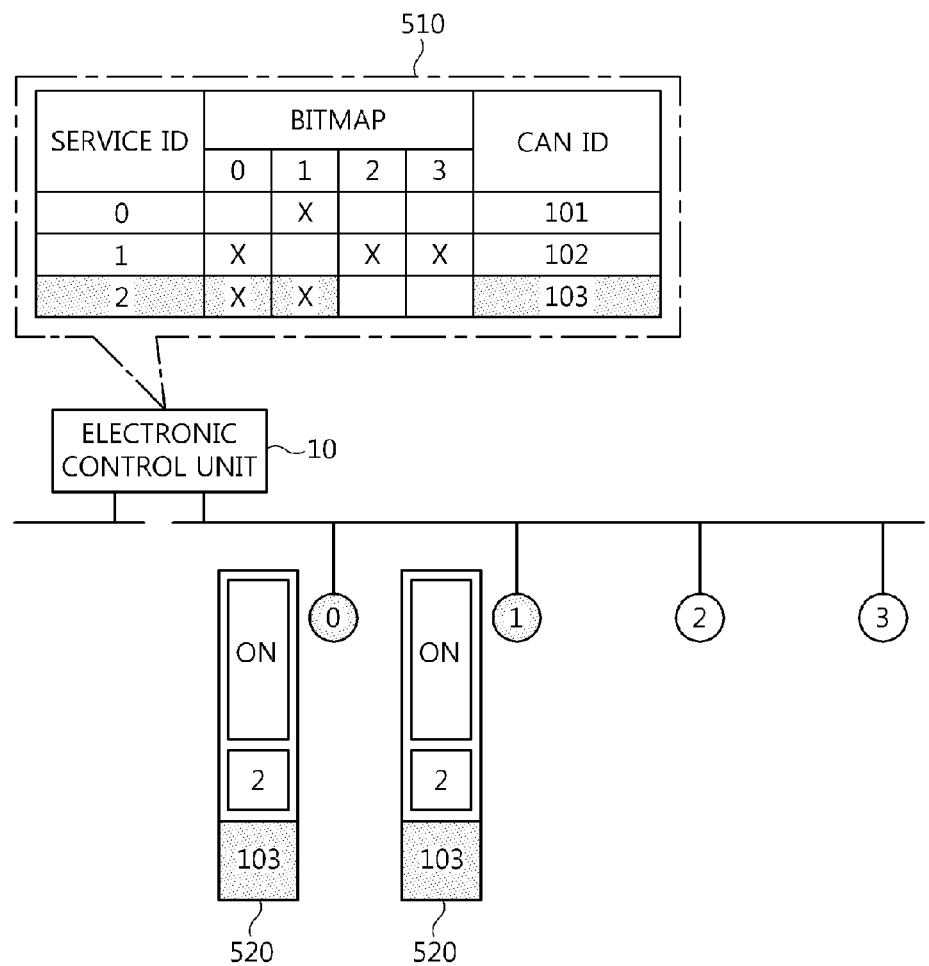
FIG. 5 is a diagram showing a automotive partial networking method applied to one network according to an embodiment of the present invention.

FIG. 5 is a diagram showing an automotive partial networking method applied to one network according to an embodiment of the present invention.

First, the automotive partial networking apparatus 300 supporting partial networking for vehicles according to the embodiment of the present invention can support partial networking for vehicles in an electronic control unit 10, but it is not limited to such a structure.

Referring to FIG. 5, when the electronic control unit 10 must operate only electronic control units corresponding to a second service 2, the electronic control unit 10 searches a partial network table 510 for a bitmap and a CAN ID. The electronic control unit 10 generates a partial networking-only CAN frame 520 using the found CAN ID.

The electronic control unit 10 transmits the generated CAN frame 520 to electronic control units ECU0 and ECU1 corresponding to the second service 2.

Each of the electronic control units ECU0 and ECU1 that received the CAN frame 520 extracts an ON/OFF command from the CAN frame 520, and is then operated in compliance with the extracted command (=ON).

In this way, the automotive partial networking method according to the embodiment of the present invention can selectively operate two electronic control units ECU0 and ECU1 among four electronic control units ECU0 to ECU3 located in the network so as to support the second service 2.

Figure 6:
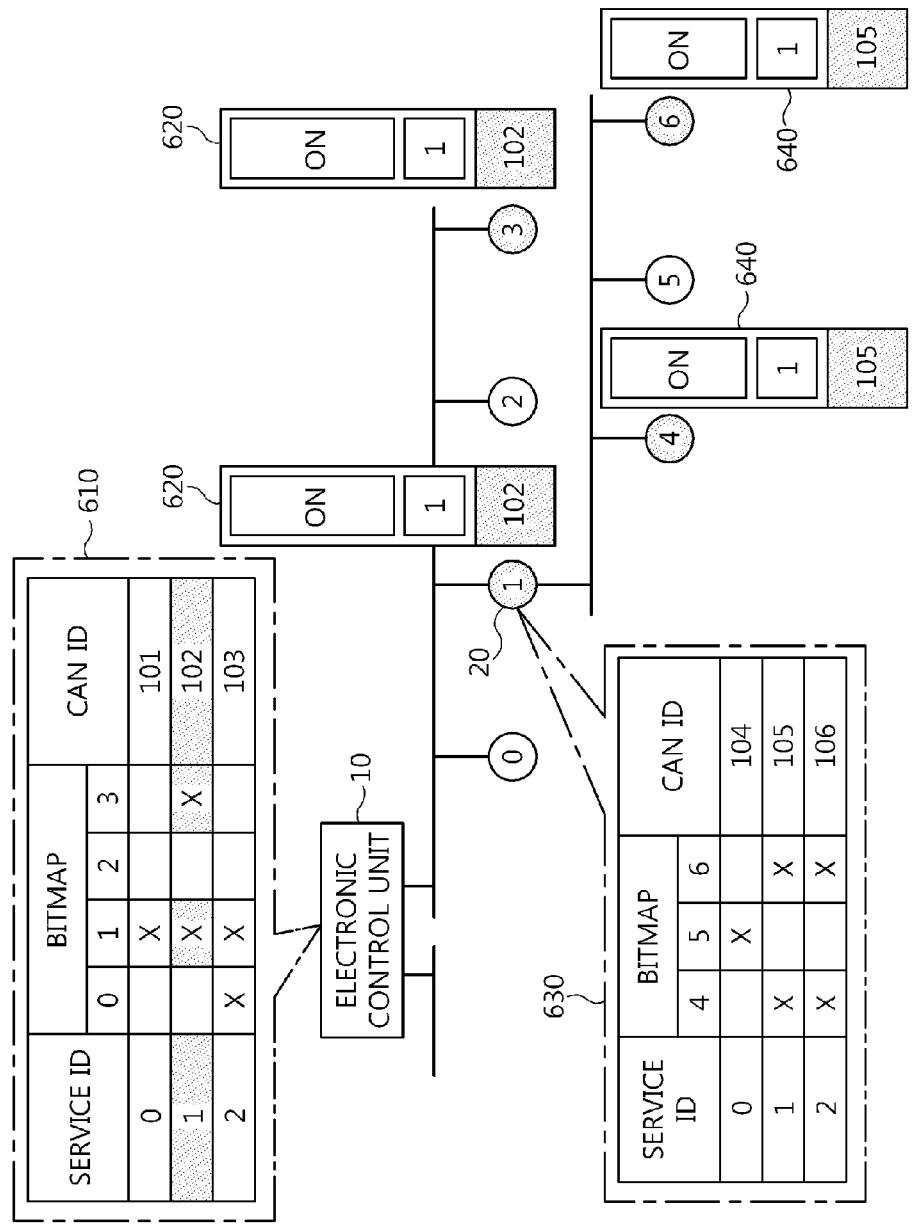
FIG. 6 is a diagram showing an automotive partial networking method applied to two or more networks according to an embodiment of the present invention.

FIG. 6 is a diagram showing an automotive partial networking method applied to two or more networks according to an embodiment of the present invention.

First, the automotive partial networking apparatus 300 supporting partial networking for vehicles according to the embodiment of the present invention can support partial networking for vehicles in an electronic control unit 10, but it is not limited to such a structure.

Referring to FIG. 6, when the electronic control unit 10 must operate only electronic control units corresponding to a first service 1, the electronic control unit 10 searches a partial network table 610 for a bitmap and a CAN ID. Next, the electronic control unit 10 generates a partial networking-only CAN frame 620 using the found CAN ID.

The electronic control unit 10 transmits the generated CAN frame 620 to electronic control units ECU1 20 and ECU3 corresponding to the first service 1.

Since the electronic control unit 20 is connected to a lower network, a service ID (service ID=1) is extracted from the CAN frame 620. Next, the electronic control unit 20 searches a partial network table 630 using the service ID for a bitmap and a CAN ID. Further, the electronic control unit 20 generates a partial networking-only CAN frame 640 using the found CAN ID.

The electronic control unit 20 transmits the generated CAN frame 640 to electronic control units ECU4 and ECU6 corresponding to the first service 1.

Each of the electronic control units ECU4 and ECU6 that received the CAN frame 640 extracts an ON/OFF command from the CAN frame 640, and is then operated in compliance with the extracted command (=ON).

In this way, the automotive partial networking method according to the embodiment of the present invention can selectively operate two electronic control units ECU1 and ECU3 among the four electronic control units ECU0 to ECU3 located in the upper network and two electronic control units ECU4 and ECU6 among the three electronic control units ECU4 to ECU6 located in the lower network so as to support the first service 1.

According to an embodiment of the present invention, the automotive partial networking apparatus and method can selectively operate only electronic control units corresponding to a service using bitmap information and CAN ID information that are set according to the vehicle service, so that the supply of power to parts that are not used among electronic control units within the vehicle is interrupted, thus reducing standby power and greatly decreasing carbon oxide ($CO_2$) emissions.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Accordingly, the technical scope of the present invention should be defined by the technical spirit of the claims.

What is claimed is:

1. An automotive partial networking method, comprising:
   receiving, by an automotive partial networking apparatus, a first partial networking-only Controller Area Network (CAN) frame from outside;
   searching, by the automotive partial networking apparatus, a partial network table based on the first partial networking-only CAN frame for a CAN identification (ID);
   generating, by the automotive partial networking apparatus, a second partial networking-only CAN frame using the CAN ID; and
   performing, by the automotive partial networking apparatus, partial networking by transferring the generated second partial networking-only CAN frame to at least one electronic control unit corresponding to a vehicle service.

2. The automotive partial networking method of claim 1, wherein the CAN ID of the second partial networking-only CAN frame has a format identical to that of a CAN ID of a CAN frame complying with an International Organization for Standardization (ISO) 11898 standard.

3. The automotive partial networking method of claim 1, wherein the searching the partial network table comprises:
   extracting a service ID from the first partial networking-only CAN frame; and
   searching the partial network table using the extracted service ID for the CAN ID.

4. The automotive partial networking method of claim 1, wherein the performing the partial networking is configured such that the at least one electronic control unit extracts a specific command from the second partial networking-only CAN frame, and selectively determines whether to operate in compliance with the extracted specific command.

5. The automotive partial networking method of claim 1, wherein:
   the second partial networking-only CAN frame comprises a CAN ID and CAN data, and
   the CAN data comprises a service ID indicative of the vehicle service and an ON/OFF command indicative of operation and termination of a corresponding electronic control unit.

6. The automotive partial networking method of claim 1, wherein the partial network table comprises a service ID indicative of a type of service supported by a vehicle, location information about an electronic control unit which is located on a bus and is to be used to provide the vehicle service at a current time, and an ID of a CAN frame which is used to transfer a message to an electronic control unit required to provide the vehicle service at the current time.

7. An automotive partial networking apparatus, comprising:
   a frame reception unit for receiving a first partial networking-only Controller Area Network (CAN) frame from outside of the automotive partial networking apparatus;
   a search unit for searching a partial network table based on the first partial networking-only CAN frame for a CAN identification (ID);
   a frame generation unit for generating a second partial networking-only CAN frame using the CAN ID; and
   a networking unit for performing partial networking by transferring the generated second partial networking-only CAN frame to at least one electronic control unit corresponding to a vehicle service.

8. The automotive partial networking apparatus of claim 7, wherein the search unit extracts a service ID from the first partial networking-only CAN frame, searches the partial network table using the extracted service ID for the CAN ID.

9. The automotive partial networking apparatus of claim 7, wherein the at least one electronic control unit that received the second partial networking-only CAN frame from the networking unit is configured to extract a specific command from the second partial networking-only CAN frame, and selectively determine whether to operate in compliance with the extracted specific command.

10. The automotive partial networking apparatus of claim 7, wherein the CAN ID of the second partial networking-only CAN frame has a format identical to that of a CAN ID of a CAN frame complying with an International Organization for Standardization (ISO) 11898 standard.

11. The automotive partial networking apparatus of claim 7, wherein the second partial networking-only CAN frame comprises a CAN ID and CAN data.

12. The automotive partial networking apparatus of claim 11, wherein the second partial networking-only CAN data comprises a service ID indicative of the vehicle service and an ON/OFF command indicative of operation and termination of a corresponding electronic control unit.

13. The automotive partial networking apparatus of claim 7, wherein the partial network table comprises a service ID indicative of a type of service supported by a vehicle, location information about an electronic control unit which is located on a bus and is to be used to provide the vehicle service at a current time, and an ID of a CAN frame which is used to transfer a message to an electronic control unit required to provide the vehicle service at the current time.

* * * * *